Feb. 6, 1940. R. M. G. PHILLIPS 2,189,403
HYDRAULIC BRAKE SYSTEM
Original Filed July 30, 1936 3 Sheets-Sheet 1
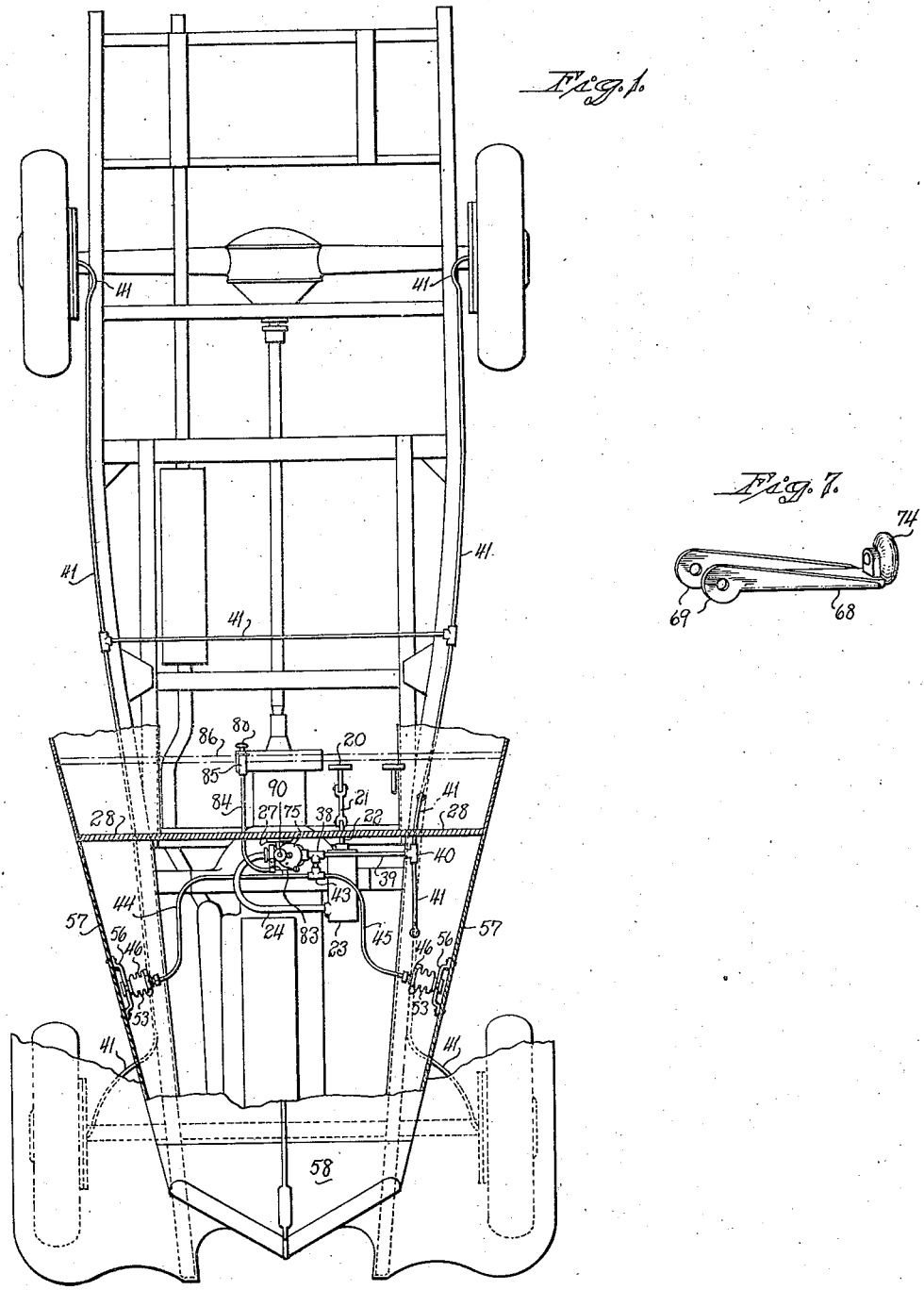

Feb. 6, 1940. R. M. G. PHILLIPS 2,189,403
HYDRAULIC BRAKE SYSTEM
Original Filed July 30, 1936 3 Sheets-Sheet 2
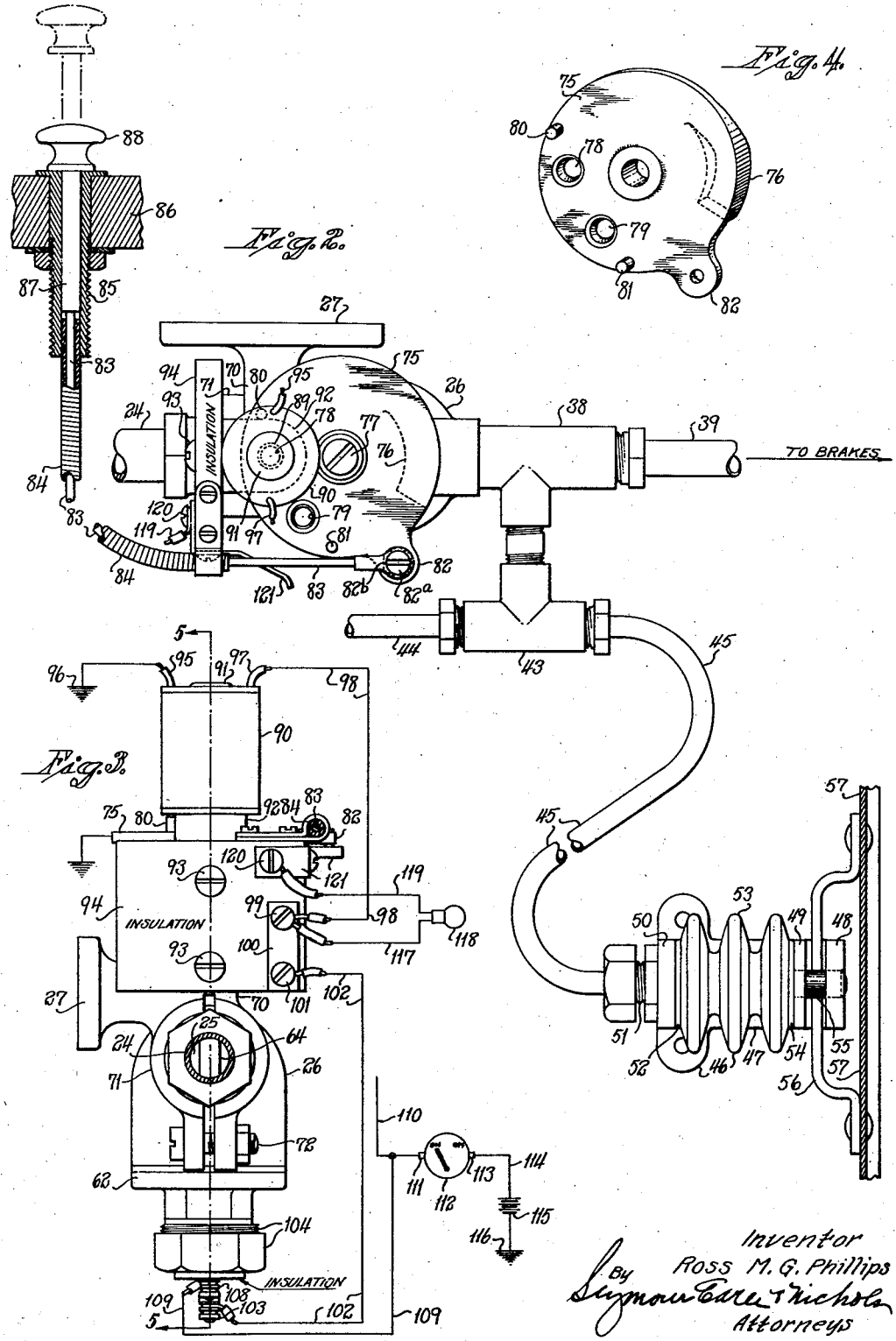

Feb. 6, 1940.    R. M. G. PHILLIPS    2,189,403
HYDRAULIC BRAKE SYSTEM
Original Filed July 30, 1936    3 Sheets-Sheet 3
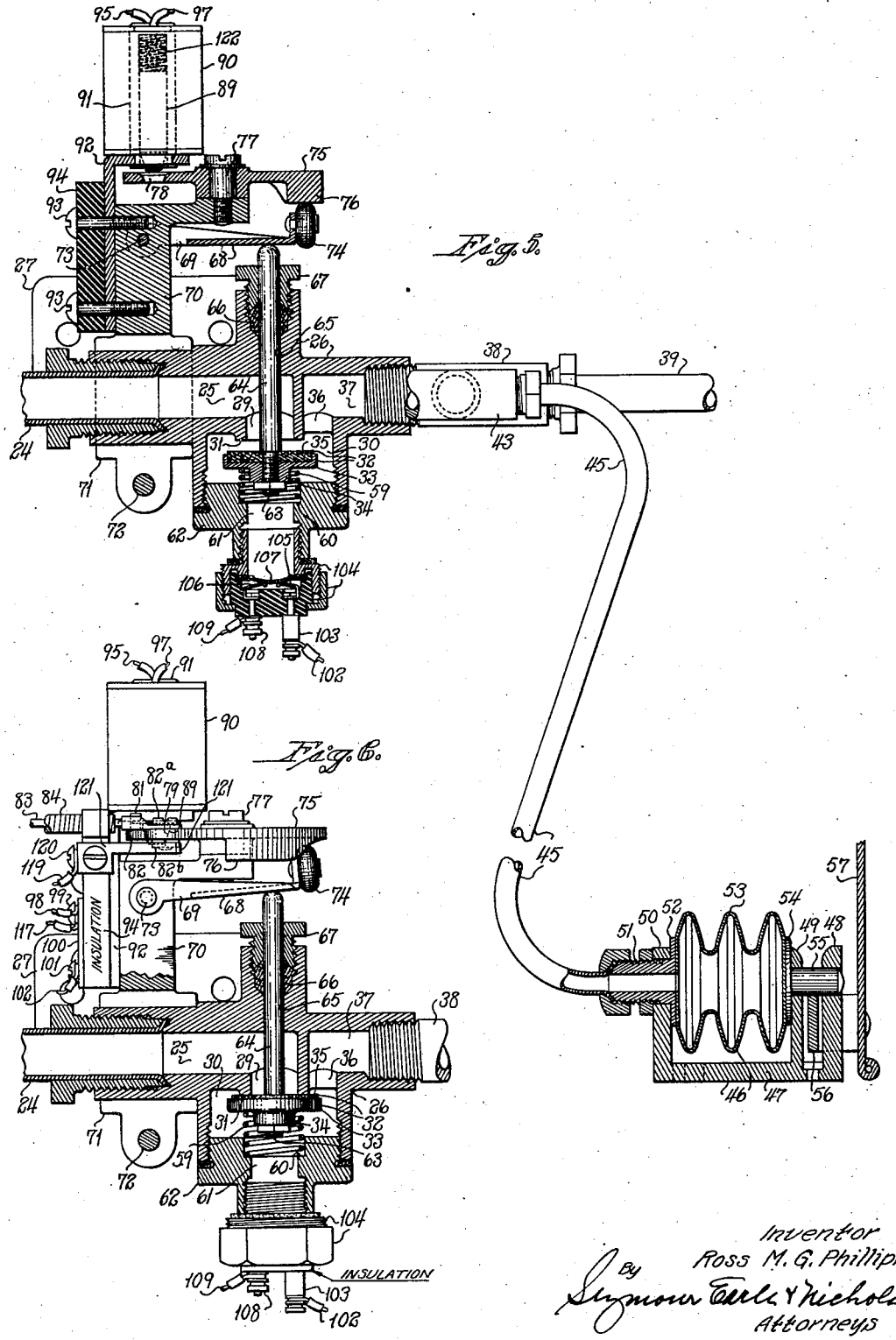

Patented Feb. 6, 1940

2,189,403

UNITED STATES PATENT OFFICE 2,189,403

HYDRAULIC BRAKE SYSTEM

Ross M. G. Phillips, West Haven, Conn.

Application July 30, 1936, Serial No. 93,375
Renewed June 27, 1939

13 Claims. (Cl. 192—3)

This invention relates to the improvement in hydraulic brake systems for automobiles and other vehicles.

One of the objects of the present invention is to provide a superior hydraulic system whereby hydraulic brakes may be maintained in their wholly or partially "on" positions independently of the brake pedal or other normal brake operating member.

A further object is to provide superior means whereby moderate hydraulic pressures may be maintained in the brake lines without interfering with the sudden increase of hydraulic pressure by the brake pedal or other brake control member of a vehicle.

Another object of the present invention is to provide superior automatic or semi-automatic means whereby hydraulic brakes may be locked in their "on" positions.

A still further object is to provide a superior hydraulic brake system in which the brakes may be conveniently locked in their "on" position and their release made dependent upon the operation of a control member of the vehicle other than the brake pedal or its equivalent.

With the above and other objects in view, as will appear to those skilled in the art from the following or from the accompanying drawings and appended claims, the present invention includes all features disclosed therein which are novel over the prior art and which are not claimed by me in a separate application.

In the accompanying drawings forming part hereof:

Fig. 1 is a broken top or plan view of an automobile chassis in which the present invention is included;

Fig. 2 is a broken top or plan view of the control device for the hydraulic brakes and the hood-locking mechanism, which latter is included in this figure;

Fig. 3 is a left-side view of the control device;

Fig. 4 is a perspective view of the valve-control disk;

Fig. 5 is a view mainly in vertical central section taken on the line 5—5 of Fig. 3 with the valve shown in its open position;

Fig. 6 is a similar view but showing the valve in its closed position; and

Fig. 7 is a perspective view of the valve-control lever.

The automobile chassis herein chosen for illustration includes a brake-pedal 20 which, in the usual manner of hydraulic brakes, is connected by a link 21 to the plunger 22 of a so-called master-cylinder 23. When the brake-pedal 20 is depressed, the fluid from the master-cylinder 23 is forced outwardly therefrom through a tube 24 to the four hydraulic brakes of the vehicle.

The features above described are in general those common to hydraulic brake systems and require no further detailed description.

The tube 24 leading from the master-cylinder 23 is connected by means of suitable fittings to the inlet-passage 25 of a control-valve housing or body 26 which is provided with a bracket 27 by means of which it may be secured to the forward face of the dash 28 of the vehicle (Fig. 1). The inlet-passage 25, just referred to, communicates through a vertical-passage 29 with a valve-chamber 30, formed within the valve-body or housing 26 adjacent the lower end thereof. Surrounding the lower terminal of the vertical-passage 29 is an annular valve seat 31 against which is adapted to seat a reciprocating valve generally designated by the numeral 32. The said valve 32 includes a metallic-shell 33 having a depending internally threaded boss 34 and having in its cupped upper face a disk of leather 36 or equivalent material for direct engagement with the valve seat 31 before referred to.

Leading upwardly from the valve-chamber 30 to one side of the passage 29 is a passage 36 communicating at its upper end with an outlet passage 37 located in axial alignment with the inlet-passage 25. Screwed into the threaded outer end of the outlet passage 37 is a T 38 to the opposite end of which is connected a tube 39 leading to another T 40 from which fluid is supplied to the front and rear brakes through a tube-system 41 (Fig. 1).

Connected to the branch of the T 38, before referred to, is the branch of a T 43. From the left end of the line-run of the said T extends a tube 44 and from the right end of which extends a tube 45. Connected to the outer ends of each of the tubes 44 and 45 is a hood-locking device, generally designated by the numeral 46. Inasmuch as both of the hood-locking devices correspond, a description of one will serve for both and similar reference characters will be applied to each.

Each hood-locking device includes a frame 47 having three up-standing arms 48, 49 and 50. Rigidly secured to the arm 50 of the frame 47 is the threaded-shank 51 of a bellow-head 52 which is soldered or otherwise secured to one end of a metallic-bellows 53. Soldered or otherwise secured to the opposite end of the bellows 53 is a bellows-head 54 carrying an outwardly projecting locking-plunger 55 adapted to extend through each of the suitably perforated arms 48 and 49 of the frame 47.

Adapted to fit in the space between the arms 48 and 49 of the frame 47 is a locking-bar 56 which is secured to the inner-face of one of the side panels 57 of an engine-hood or other closure generally designated by the numeral 58. When the brakes are applied the locking-bolt 55 is extended by the bellows 53 and, as shown in Figs. 2 and 5, overlies the locking-bar 56, and thereby prevents the adjacent side panel 57 of the hood 58 from being raised.

Returning now to the valve-body 26 and its associated parts, it will be noted by reference to Figs. 5 and 6 in particular that the threaded boss 34 of the shell 33 of the valve 32 is encircled by the upper end of a helical-valve-closing spring 59, the lower end of which latter rests against an annular-shoulder 60 formed in the axial-passage 61 in a plug-member 62 threaded into the lower end of the valve-body 26.

Threaded into the boss 34 of the valve 32 is the externally threaded reduced lower end 63 of a valve-stem 64 extending centrally upwardly through the passage 29 in the valve-body 26 and thence diametrically across the inner end of the inlet-passage 25 therein, and upwardly through a guide-passage 65 in the said valve-body 26. The said valve-stem is adapted to reciprocate in the guide-passage 65 and in a packing-ring 66 which latter is retained in place in the said valve-body by means of a packing-nut 67 through which the said valve-stem 64 also extends.

The upper end of the valve-stem 64 is suitably rounded and bears against the underface of a valve-control lever 68 bifurcated at its inner end as at 69 to straddle the adjacent portion of a bracket 70 upstanding from the valve-body 26 and clamped to the same by being provided with a split clamping-band 71 and a clamping-bolt 72 extending through the lower end of the latter, as especially well indicated in Fig. 3. The bifurcated inner end of the valve control lever 68 is pivotally attached to the upstanding portion of the bracket 70 by a transverse pivot pin 73, as particularly well shown in Figs. 5 and 6. The outer end of the lever 68 is provided with an antifriction roller 74 which engages with the underface of a valve control disk 75 having an arcuate cam-rib 76 thereon for the purpose as will hereinafter appear.

The valve-control disk 75 is mounted for oscillatory movement upon a stud 77 which is rigidly mounted in the bracket 70 before referred to. The said disk 75 is provided with two vertical tapered locking-sockets 78 and 79 and with two spaced-apart vertically extending stop-pins 80 and 81 which latter are respectively adapted to engage the respective opposite side-edges of a supplemental bracket 92 to limit the oscillatory movement of the disk 75. The disk 75 is also provided with a radially offsetting perforated ear 82 to which is pivotally connected, by means of a stud 82ª and a nut 82ᵇ, one end of a reciprocating flexible shaft 83 (Figs. 1 and 2). The said shaft 83 serves to oscillate the disk 75 for the purpose as will hereinafter appear.

The flexible shaft 83 extends through a flexible casing 84 having its outer end secured to the externally threaded body of a push-pull device generally designated by the numeral 85 and mounted in the instrument-panel 86 of the vehicle. The adjacent end of the flexible-shaft 84 is rigidly attached to the shank 87 of a control-plunger 88 as particularly well shown in Fig. 2.

The tapered locking sockets 78 and 79 in the valve-control disk 75 are adapted to be alternately engaged for locking said disk in either one of its two positions by the tapered lower end of a locking-plunger 89 which is formed of magnetic material and which forms the reciprocating armature of an electromagnet 90. The said electromagnet 90 is rigidly fixed in place by having its tubular core 91 riveted in the upper end of a supplemental-bracket 92 which is secured to the bracket 70 before referred to by suitable screws 93. The screws 93 also pass through a block of fiber or other suitable insulation 94 as clearly shown in Fig. 5.

One terminal 95 of the electromagnet 90 is connected to a ground 96 while its other terminal 97 is connected by means of a wire 98 (Fig. 3) to the upper binding-screw 99 of a connector-plate 100 mounted upon the outer face of the insulating-block 94 before referred to. The lower binding-screw 101 of the connector-plate 100 is connected by a wire 102 to one terminal 103 of an hydraulic-switch generally designated by the numeral 104 and which is screwed into the lower end of the plug member 62 in the valve-body 26. The upper end of the terminal 103 is provided with a resilient contact 105 which is adapted to be interconnected with a similar contact 106 by means of a flexible diaphragm 107 which latter is exposed to the hydraulic pressure occasionally existing in the axial-passage 61 in the plug member 62. The said diaphragm 107, in the absence of hydraulic-pressure, remains out of engagement with the contacts 105 and 106.

The resilient contact 106 is located at the inner end of a terminal 108 complementing the terminal 103 before referred to and connected by means of a wire 109 to an ignition-wire 110. The ignition-wire 110 leads from one terminal 111 of an ignition-switch 112 to an ignition-coil (not shown) in the usual manner of ignition systems for internal combustion engines. The opposite terminal 113 of the ignition-switch 112 is connected by a wire 114 to one terminal of a battery 115 which latter has its opposite terminal connected to a ground 116.

In the foregoing, it will be seen that the hydraulic-switch 104 and the ignition-switch 112 are connected in series insofar as the supply of current to the electromagnet 90 is concerned.

Also connected to the upper binding-screw 99 of the connector-plate 100 is a wire 117 leading to one terminal of a telltale bulb 118 which has its opposite terminal connected by means of a wire 119 to the binding-post 120 of a resilient contact-finger 121 which is secured to the insulating-block 94 before referred to. The contact-finger 121 is adapted on occasion to be engaged by the nut 82ᵇ carried by ear 82 of the disk 75 so as to close a circuit through the telltale bulb 118 when the said disk 75 is moved in a clockwise direction from the position from which it is shown in Fig. 2 to the other extreme of its movement.

For the purpose of a better understanding of the operation of the apparatus herein illustrated, let it be assumed that the valve control disk is in the position in which it is shown in Figs. 1, 2 and 5 in which its cam-rib 76 is holding the lever 68, and hence the valve-stem 64, down so that there may be a free reverse flow of fluid through the valve-body 26 and thence back to the master-cylinder 23.

Under the conditions just above described, whenever the brakes are applied by means of the brake-pedal 20, the hydraulic pressure thus created in the entire system will cause the diaphragm 107 of the hydraulic-switch 104 to connect the contacts 105 and 106 of the said switch and thus supply current to the electromagnet 90 (provided the ignition-switch 112 is also "on") thereby retracting the locking-plunger 89 and permitting the operator of the vehicle, if he so desires, to swing the valve control disk 75 from the position in which it is shown in Figs. 1, 2 and 5 to the position in which it is shown in Fig. 6.

The instant that hydraulic pressure in the system is relaxed, the diaphragm 107 will move out of engagement with the contacts 105 and 106 of the hydraulic-switch 104 and thus break the circuit to the electromagnet 90 with the effect of permitting the locking-plunger 89 thereof to descend, under the urge of a helical-spring 122, into the locking-socket 78 in the disk 75. The said disk will thus be locked against inadvertent shifting into its other position until such time as the hydraulic-switch 104 again closes the circuit to the electromagnet in response to the creation of hydraulic pressure against its diaphragm 107.

Regardless of the position of the disk 75 or of the valve 32 each time there exists hydraulic pressure in the valve-chamber 30 of the body 26, each of the hood-locking devices will be operated to lock their respective hood panels 57.

If the operator now desires to maintain hydraulic pressure in the brake system, (for parking or for retardation on a long down grade) he may depress the brake-pedal 20 to supply hydraulic pressure of the desired degree and thereafter pull outwardly upon the control-plunger 88 which will effect the turning of the disk 75 so as to move its cam-rib 76 to one side of the roller 74 of the lever 68 and thus permit the valve 32 to rise under the urge of its spring 59 to engage with the valve-seat 31. Thus, despite the subsequent relaxing of foot pressure upon the brake-pedal 20, hydraulic pressure will be maintained in the brake system and in the hood-locking devices 46.

Under the conditions just above described the locking-plunger 89 will remain in its retired position just so long as the ignition-switch 112 is "on." If, however, the ignition-switch 112 is turned into its "off" position, as when the vehicle is parked, the current to the electromagnet 90 will be cut-off and the locking-plunger 89 will descend into the locking-socket 79 in the valve-control disk 75 and lock the same against being shifted until such time as the ignition-switch is again turned "on."

It is to be borne in mind in this connection that before the valve control disk 75 can be shifted from either of its two positions to the other, not only must the ignition-switch be "on," but hydraulic pressure must also exist against the diaphragm 107 of the hydraulic-switch 104 since otherwise the locking-plunger of the electromagnet 90 will not be withdrawn to permit the turning of the said disk 75. By making the shifting of the brake-control valve dependent upon the action of the ignition-switch or other control-member of the vehicle inadvertent opening or closing of the said valve, especially by children left alone in an automobile, is guarded against to a maximum degree.

Furthermore, by making the closing of the brake-control valve dependent upon the existence of hydraulic pressure in the hydraulic switch and in the brake-system, the shifting of the said valve into its sealing position, under the erroneous impression that the brakes are "on," is avoided. This feature is valuable whether or not the shifting of the valve is made also dependent upon the ignition-switch or other control feature of the vehicle.

The valve 32 may be closed to seal hydraulic pressure in the brake system and in the hood-locking devices 46 when an automobile equipped with the present apparatus is parked, and also when descending a long hill. Under the latter circumstances it very often happens that the operator of the vehicle desires to maintain a pressure in the brake system which is but relatively slight. Should the operator, however, be confronted with a sudden emergency requiring him to apply the maximum of brake pressure he may depress the brake-pedal 20 and thereby force the valve 32 open to permit the increase of pressure in the brake system and its connected features.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; operating-means operatively connected to the said valve for shifting the same at the will of the operator; a control-member controlling the running of the vehicle; and locking-means for positively holding the said valve in a desired position against inadvertent shifting therefrom, including a locking-member operatively associated with and shiftable by the said control-member independently of the aforesaid operating means.

2. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; an ignition switch controlling the running of the vehicle; and locking-means for the said valve including a locking-member operatively associated with the said ignition switch so as to be shiftable in response to the movement thereof.

3. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; a control-member controlling the running of the vehicle; and locking-means for positively holding the said valve in a desired position against inadvertent shifting therefrom, including an electromagnet, a locking-member operated thereby, and an electric circuit for said electromagnet, the said electric circuit being controlled by the said control-member.

4. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; an ignition switch controlling the running of the vehicle; and locking-means for the said valve including an electromagnet, a locking-member shiftable thereby, and an electric circuit for the said electromagnet, the said electric circuit being connected to the said ignition switch so as to be energized in response to the movement thereof.

5. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; a control-member controlling the running of the vehicle; a pressure-responsive device hydraulically connected to the said brake feed-line; and locking-means for positively holding the said valve in a desired position against inadvertent shifting therefrom, including a locking-member operatively associated with and shiftable by the movement of both the said control-member and the said pressure-responsive device.

6. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; an ignition switch controlling the running of the vehicle; a pressure-responsive device hydraulically connected to the said brake feed-line; and locking-means for the said valve including a locking-member operatively associated with and shiftable by the movement of both the said ignition switch and the said pressure-responsive device.

7. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; a control-member controlling the running of the vehicle; a pressure-responsive switch hydraulically connected to the said brake feed-line; and locking-means for the said valve including an electromagnet, a locking-member operated thereby, and an electric circuit for the said electromagnet, the said electric circuit being under the joint control of the said control-member and of the said pressure-responsive switch.

8. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; an ignition switch controlling the running of the vehicle; a pressure-responsive switch hydraulically connected to the said brake feed-line; and locking-means for the said valve including an electromagnet, a locking-member operated thereby, and an electric circuit for the said electromagnet, the said electric circuit being under the joint control of the said igniton switch and of the said pressure-responsive switch.

9. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; a pressure-responsive device hydraulically connected to the said brake feed-line; and locking-means for positively holding the said valve in a desired position against inadvertent shifting therefrom, including a locking-member operatively associated with and shiftable by the said pressure-responsive device.

10. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; a pressure-responsive switch hydraulically connected to the said brake feed-line; and locking means for the said valve including an electromagnet, a locking-member operated thereby, and an electric circuit for the said electromagnet, the said electric circuit being connected to and controlled by the said pressure-responsive switch.

11. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; manual operating-means for shifting the said valve; and electromagnetic locking-means constructed and arranged to lock the said manual operating-means of the said valve.

12. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; manual operating-means for shifting the said valve; electromagnetic locking-means constructed and arranged to lock the said operating-means of the said valve; and an electric switch controlling the said electromagnetic locking-means.

13. A hydraulic brake system including in combination: a source of hydraulic pressure controllable by the operator of a vehicle; a brake feed-line leading from the said source of hydraulic pressure; a valve interposed in the said brake feed-line in position to seal fluid in the brakes of the vehicle; manual operating means for shifting the said valve; electromagnetic locking-means constructed and arranged to lock the said valve; and two electric switches arranged in series and controlling the current-supply to the said electromagnetic locking-means.

ROSS M. G. PHILLIPS.